UNITED STATES PATENT OFFICE.

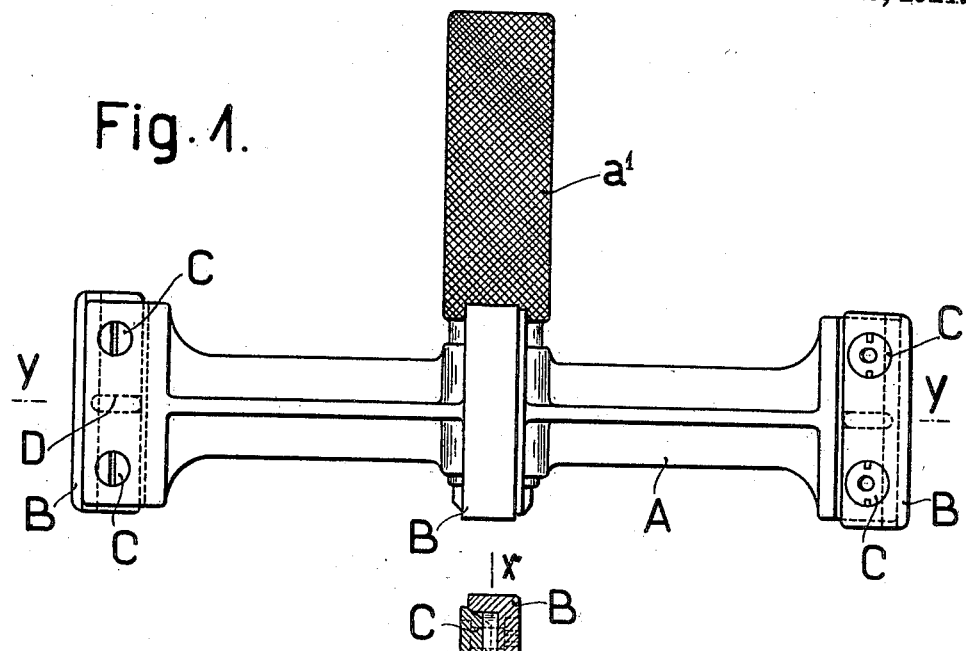
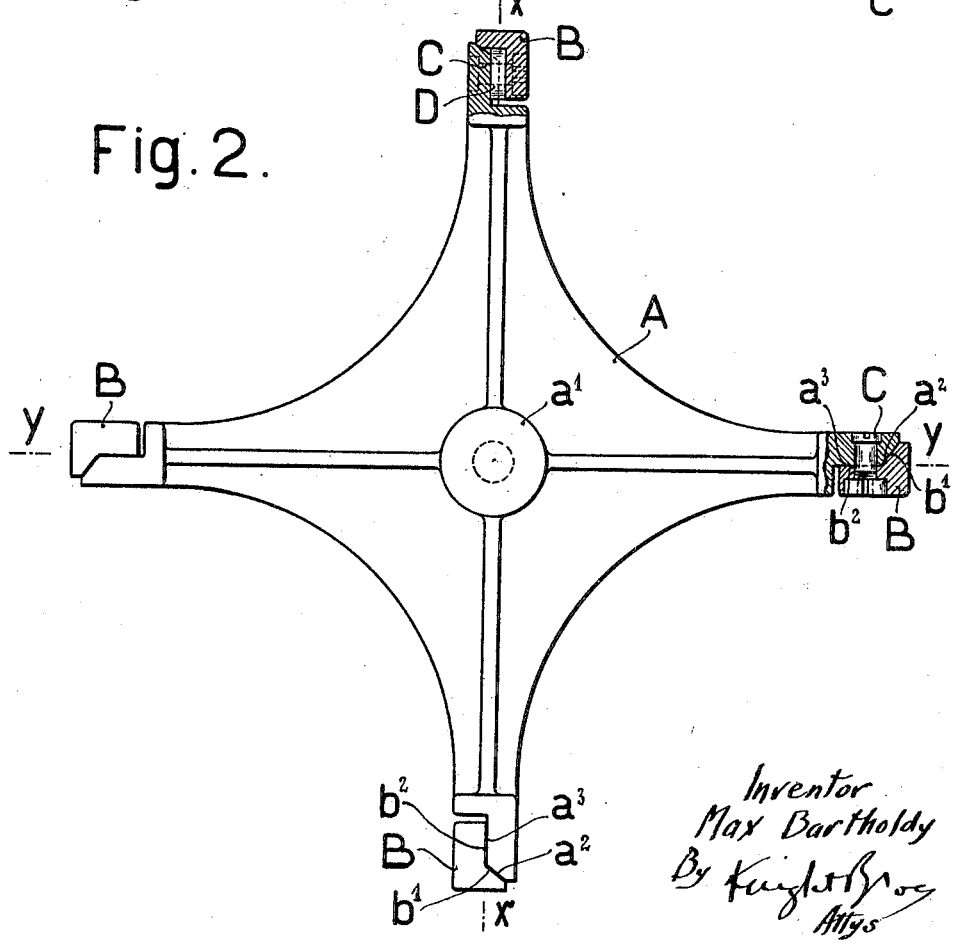

MAX BARTHOLDY, OF KARLSKOGA, SWEDEN, ASSIGNOR TO FRIED. KRUPP AKTIEN-GESELLSCHAFT, OF ESSEN-ON-THE-RUHR, GERMANY.

GAGE.

1,398,311. Specification of Letters Patent. Patented Nov. 29, 1921.

Application filed November 6, 1920. Serial No. 422,370.

*To all whom it may concern:*

Be it known that I, MAX BARTHOLDY, residing at Karlskoga, Sweden, a citizen of the German Republic, have invented a certain new and useful Improvement in Gages, for which I have filed application in Germany, June 27, 1919, and of which the following is a specification.

This invention relates to gages having measuring jaws forming a separate part thereof, and has for its object to so construct such gages that the jaws, after their measuring-surfaces have worn down, may be re-set to the extent required and at the same time be reliably secured against any unintentional shift or displacement after having been so set.

One embodiment of the subject matter of the invention is shown in connection with a hole gage in the annexed drawing in which—

Fig. 1 is a side view of the hole gage.
Fig. 2 a top view partly in section thereof.

Referring to the drawing, the cross-shaped body A of the gage is provided with a handle $a^1$, while the extremity of each of its arms which are disposed in the measuring direction $x$—$x$ and $y$—$y$ respectively is beveled off at an angle to said direction so as to form abutment surfaces $a^2$ against which the measuring jaws B are adapted to bear by means of a suitably inclined surface $b^1$. Furthermore the measuring jaws bear up by aid of a surface $b^2$, disposed in the measuring direction and forming an obtuse angle with the bevel surface $b^1$, against a correspondingly shaped face $a^3$ of the gage body A, and are connected to this latter by bolts and nuts C pressing the surface $b^2$ against the surface $a^3$ and the surface $b^1$ against the surface $a^2$. The measuring jaws are secured against lateral movement by spacing blocks D. The opposed faces of the measuring jaws B and of the extremities of the arms of the body A are suitably recessed to accommodate these spacing blocks.

This improved arrangement is intended to secure the possibility of re-setting measuring-jaws that have either been worn down or injured in use, and also to enable their being fixed again in their new position by the help of the bolts and nuts C. The re-setting is effected as follows: After the measuring-jaws B have first of all been removed from the gage body, the surfaces $b^2$ thereof are suitably ground off. Thereupon the jaws B are again placed with their bevel surfaces $b^1$ on the bevel surfaces $a^2$ of the gage body A, and then shifted in the direction of the surface $a^2$ until the section ground off comes to bear against the surface $a^3$ of the gage body. When in this position, and being now lodged at a somewhat greater distance than before from the central axis of the gage body, the jaws are again secured to the body A by means of the bolts and nuts C and once more ground off till the proper dimension has been attained. As no washers, or the like, need be arranged intermediate the jaws and the gage body in order to secure this dimension there does not exist any possibility whatsoever of its being subsequently unintentionally or accidentally altered.

Claims.

1. A gage comprising a body, coöperating measuring members secured to said body, said body being provided with abutment faces inclined to the measuring direction, said measuring members being provided with similarly inclined abutment faces, means embodying additional abutment faces for fixing the measuring members to the gage body and permitting of re-setting said members.

2. A gage body and measuring jaws forming separate parts, a device of the class described comprising said body being formed with abutment faces for said jaws inclined obliquely to the measuring direction, means permitting of re-setting said jaws in the direction of said oblique faces and means embodying additional abutment faces for fixing said jaws on said gage body, said fixing means being adapted to fix said jaws in the re-set position also.

3. A gage comprising a gage body and measuring jaws forming separate parts, said body being formed with abutment faces for said jaws inclined obliquely to the measuring direction, means permitting of re-setting said jaws in the direction of said oblique faces, said body being formed with additional abutment faces arranged at an obtuse angle with respect to said first-named abutment faces and means for fixing said jaws on said gage body.

4. A gage having a gage body and measuring jaws forming separate parts, said body being provided with abutment faces for said jaws inclined obliquely to the measuring direction, means permitting the resetting of said jaws in the direction of said oblique faces, said body being provided with additional abutment faces arranged at an obtuse angle with respect to said first-named abutment faces and means for fixing said jaws on said gage body, said fixing means being adapted to fix said jaws in the re-set position also.

5. A gage comprising a body having four radially disposed arms, coöperating measuring members separably carried by the extremities of said arms, the ends of said arms being provided with radially disposed abutment faces and inclined abutment faces inclined to the measuring direction, said measuring members being provided with similarly-shaped coöperating faces and means for fixing said members to said arms, as and for the purpose described.

The foregoing specification signed at—— Sweden, this 6th day of October, 1920.

MAX BARTHOLDY.

In presence of—
  P. A. HERNELL,
  G. SJAZREN.

Correction in Letters Patent No. 1,398,311.

It is hereby certified that in Letters Patent No. 1,398,311, granted November 29, 1921, upon the application of Max Bartholdy, of Karlskoga, Sweden, for an improvement in "Gages," an error appears in the printed specification requiring correction as follows: Page 1, strike out the first three lines of claim 2 and insert instead *A device of the class described comprising a gage body and measuring jaws forming separate parts, said body being formed;* and that the said Letters Patent should be read with this correction therein that the same may conform to the record of the case in the Patent Office.

Signed and sealed this 3d day of January, A. D., 1922.

[SEAL.]

WM. A. KINNAN,
*Acting Commissioner of Patents.*